Patented June 25, 1935

2,005,786

UNITED STATES PATENT OFFICE 2,005,786

STABILIZED CITRUS BEVERAGE AND SIRUP

Ralph H. Higby, Ontario, Calif., assignor to California Fruit Growers Exchange, Los Angeles, Calif., a corporation of California No Drawing. Continuation of application Serial No. 438,902, March 25, 1930. This application March 19, 1934, Serial No. 716,336

18 Claims. (Cl. 99—11)

This invention relates to citrus beverages and sirups which are of a stable non-fading color.

It is well known to those conversant with commercial beverages, that it is of prime importance for a prepared beverage to have a color resembling as closely as possible that of the natural article or product which is the source of the beverage, or which it simulates. In the production of prepared beverages from citrus fruits, and particularly those derived from the orange, the problem of producing and maintaining a suitable color has been particularly difficult.

This problem has been especially manifested in the commercial handling of carbonated and uncarbonated beverages of the true fruit type, containing minor proportions, such as from about 8% to 12% of citrus juice. Heretofore, beverages of this class have been colored to the desired shade by the addition of colors or dye.

For producing an orange color of pleasing appearance, a suitable orange color or mixture of red color with a yellow color is ordinarily employed. Such mixtures consisting of colors heretofore regarded as suitable for use have had a high degree of unstability in true fruit beverages, and particularly in citrus beverages. It will be readily understood that an orange beverage of unstable color is not suitable for commercial purposes. The value of such an article is dependent upon its appeal to the consuming public. A beverage which has a faded, pink or faintly yellowish color or which is faded to substantially a water-white, can not be successfully sold as an orange beverage.

In orange beverages of the true fruit type, prepared heretofore, the color contained therein has frequently, and the yellow constituent of the color has almost uniformly, been subject to a pronounced fading. This fading is accelerated when the beverage is exposed to light, which necessarily occurs frequently during commercial handling. This is particularly true when samples are placed on display and thus exposed to the light.

I have now discovered that by the addition of very small proportions of materials which, for the sake of convenience I will refer to as anti-catalysts or color stabilizing agents, I am able to eliminate the fading of color almost entirely.

The substances which I find suitable for use as color stabilizers are organic substances which, according to present understanding of their structure, have present what is commonly referred to as a quinoid linkage or quinoidal group, and preferably the ortho quinoid compounds.

Accordingly, an object of my invention is to provide a citrus beverage which has a stable color, that is, a color which will not fade or change by exposure of the beverage to light.

Another object of my invention is to regulate and stabilize the color of citrus beverages by means of a color stabilizing agent.

Another object of my invention is to regulate and stabilize the color of citrus beverages by means of a substance containing a quinoid linkage.

Another object is to disclose and provide a non-fading citrus beverage containing a color stabilizing agent.

A still further object is to provide a non-fading citrus beverage containing a quinoidal substance as a color stabilizing agent.

Another object of my invention is to disclose and provide a concentrated base for the production of citrus beverages having a stable color.

Other objects and advantages will appear from a consideration of the invention as set forth hereinafter, and from the specific examples given therein.

For purposes of illustration, the invention will be described as applied to the production of a carbonated true fruit orange beverage containing about 8% of orange juice and about 2% or more of other citrus juice, such as lemon juice.

It is to be understood that the description given hereinafter and relating to a beverage of this character is merely given for illustrative purposes, as it represents a common type of beverage, and the invention is not limited to its application to such specific beverage.

As stated hereinabove, the invention particularly relates to the use of a color stabilizing agent which will prevent or inhibit the fading of citrus beverages. Among the substances which I have found to be suitable for use as color stabilizers may be mentioned beta-naphthoquinone, 1-5 dihydroxyanthroquinone, benzoquinone, quinhydrone and the potassium salt of 2-4 dinitro-alpha-naphthol-7-sulphonic acid. All of these compounds are commercially available. They are all non-toxic, even in proportions considerably greater than those employed. The potassium salt of 2-4 dinitro-alpha-naphthol-7-sulphonic acid is generally referred to as naphthol yellow S, and is a certified food color. This compound imparts a yellow color to beverages but could not heretofore be employed in citrus beverages as a color because of a highly undesirable flavor which is produced thereby.

However, naphthol yellow S may be employed in citrus beverages in accordance with my invention as a color stabilizing compound in conjunction with other dyes or colors. Any one or more of the compounds listed above, or another compound containing a quinoidal linkage may be used as a stabilizing agent. However, obviously, the color stabilizer employed should be sufficiently soluble in the finished beverage for enough of it to be dissolved to exert the desired anti-fading and stabilizing action upon the beverage.

It is to be understood that the color stabilizing materials consisting of compounds having the quinoid linkage, or other compounds of the same class and similar type are to be employed in very small proportions in conjunction with a suitable mixture of red and yellow and/or other colors as will give the desired orange or other citrus beverage color. The color stabilizing material will then act in the finished beverage or in the sirup or bottling mix from which the beverage is to be made, so as to greatly reduce or entirely eliminate the susceptibility of the beverage to fade or change in color.

Any of the well known dyes or food coloring compounds may be employed, such as for example, Ponceau 3—R which is a red dye, orange—1, sunset yellow F—C—F and the like. The coloring substances may be added to the concentrated fruit juice from which the sirup is prepared, to the bottling mix, or to the finished beverage, but in all instances in accordance with my invention, an anti-catalyst preferably consisting of a compound including the quinoid linkage is employed in conjunction with the coloring matter, so as to prevent such coloring matter from fading upon exposure to light.

In order that others skilled in this art may make and use my invention, I will now give an example of its practical application, although the broad outline and explanation given above would enable the invention to be practiced by any one skilled in the art.

It is to be understood that the example given hereinafter does not in any way limit the invention to the particular proportions and materials there employed, but is merely exemplary of a mode of procedure making use of my invention.

In making up a beverage in accordance with this invention, I first prefer to make a blend from sugar, water and orange oil. The materials may be employed in about the following proportions:

Sugar _____ 226 grams
Water _____ 671 ml.
Orange oil _____ 55 grams

If the beverage is to be benzoated the desired amount of sodium benzoate may be added. Small amounts of additional flavoring or any other constituents which it may be desired to add may also be incorporated in such blend.

In addition, the desired color or colors are also added, for example, sunset yellow F—C—F which gives a satisfactory orange color. When sunset yellow F—C—F is employed, about 8 grams of this color is added to the ingredients specifically named hereinabove. These ingredients will make about 1 quart of blend.

The color stabilizer may be added to the blend or it (as well as the color) may be added at later steps of the process. When added to the blend made as described hereinabove, the quinoid color stabilizer is added in amounts of from about 1 gram to 4 grams.

It is obvious that the various amounts specifically enumerated hereinabove may be considerably varied without departing from the invention. It is also to be noted that none of the anti-catalytic materials when used in the proportions defined hereinabove give the beverage a color which is perceptible for practical commercial purposes.

The flavoring blend described hereinabove may then be added to concentrated orange juice, for example, an orange juice concentrated to somewhat above 50° Brix and containing about 10% of acid expressed as anhydrous citric acid. In order to produce the desired acidity it may be necessary to add certain amounts of citrus or other juice high in citric acid, or citric acid per se may be used as a substitute material or in addition to the natural citric content of the juice.

The mixture of blend and concentrated orange juice is generally referred to as the "bottling mix". The blend may be added to the orange juice in the proportion of about 1 pint of blend to a gallon of orange juice. As stated hereinabove, the addition of the stabilizing agent may be made to this "bottling mix" instead of to the blend. The stabilizing material will maintain the color of the bottling mix in this concentrated form just as well as in more dilute forms.

The bottling mix is used in making the final sirup, about 1 gallon of the bottling mix being added to about 9½ gallons of sugar sirup of about 32° Bé., and 5¾ gallons of water. If desired the stabilizing agent may not be added to the blend or to the bottling mix, but instead be added to the sirup at this point. In the proportions stated, the beverage concentrate will contain from about 0.01% to 0.04% of the color stabilizing agent.

The beverages are made from this sirup and if a carbonated beverage is to be made, about 2 ounces of this sirup is used, with about 4 or 4½ ounces of carbonated water, so as to produce about 6½ ounces of the final carbonated beverage.

Citrus beverages made as described hereinabove will have a highly desirable, stable orange color which will not fade upon exposure to light, and to all intents and purposes the color remains fixed for an undetermined length of time.

The proportions and materials defined hereinabove may be materially varied without departing from the invention, which includes all such changes and modifications as come within the scope of the following claims. This application is a continuation of Serial No. 438,902, filed March 25, 1930.

I claim:

1. A citrus beverage containing a quinoid compound in amounts sufficient to inhibit the fading of natural and added color present in the beverage but insufficient to impart an undesirable taste to the beverage.

2. A citrus beverage base of acid character containing concentrated citrus juice, an added coloring material, and a quinoid compound adapted to stabilize the natural and added color of such beverage base and prevent fading thereof upon exposure to light.

3. A citrus beverage containing naphthol-yellow S in proportions insufficient to impart a perceptible yellow color to the beverage, but sufficient to inhibit the fading of an added dye with which the beverage is colored.

4. An aqueous citrus beverage of acid character containing an ortho quinoid compound in amount sufficient to substantially retard the fading of added color present in the beverage but insufficient to impart an undesirable flavor to the beverage.

5. An aqueous citrus beverage base containing concentrated citrus juice and added coloring material, and containing an ortho quinoid color stabilizing agent adapted to stabilize the color thereof.

6. An aqueous citrus beverage containing sugar, fruit acid and a soluble non-toxic quinoid color stabilizing compound in amount sufficient to inhibit the fading of natural color of the beverage and of an added dye with which the beverage is colored, upon exposure of the beverage to light.

7. A citrus beverage containing an orthoquinoid compound in amount sufficient to inhibit the fading of natural and added color present in the beverage but insufficient to impart an undesirable taste to the beverage.

8. A concentrated citrus beverage base containing a quinoid compound in amount sufficient to inhibit the fading of natural and added color present in beverages made therefrom but insufficient to impart an undesirable taste to the beverage.

9. A citrus beverage base containing naphthol yellow S in proportions insufficient to impart a perceptible yellow color to beverages made therefrom but sufficient to inhibit the fading of an added dye with which the beverage is colored.

10. A citrus beverage base containing concentrated citrus juice, an added coloring material, and from 0.01% to 0.05% of a quinoid compound adapted to stabilize the natural and added color of such beverage base and prevent fading thereof upon exposure to light.

11. A beverage blend for use with citrus juices in the manufacture of beverages therefrom, said beverage blend including a quinoid compound adapted to stabilize and inhibit the fading of natural and added color present in the beverage but insufficient to impart an undesirable taste to the beverage.

12. A citrus beverage of acid character containing concentrated citrus juice, an added coloring material, and naphthol yellow S in quantity sufficient to stabilize the natural and added color of such beverage base and prevent fading thereof upon exposure to light.

13. An aqueous beverage of acid character containing concentrated citrus fruit juice including sugar, a fruit acid, an added coloring material, and naphthol yellow S in amount sufficient to inhibit the fading of natural and added color present in the beverage but insufficient to impart an undesirable taste to the beverage.

14. A citrus beverage containing naphthold yellow S in amount sufficient to inhibit the fading of natural and added color present in the beverage but insufficient to impart an undesirable taste to the beverage.

15. A concentrated citrus beverage base containing naphthol yellow S in amount sufficient to inhibit the fading of natural and added color present in beverages made therefrom but insufficient to impart an undesirable taste to the beverages.

16. A citrus beverage base containing concentrated citrus juice, an added coloring material, and from 0.01% to 0.05% of naphthol yellow S. whereby the natural and added color of such beverage base is stabilized and prevented from fading upon exposure to light.

17. A beverage blend for use with citrus juices in the manufacture of beverages therefrom, said beverage blend including naphthol yellow S in quantity sufficient to stabilize and inhibit the fading of natural and added color present in the beverage but insufficient to impart an undesirable taste to the beverage.

18. An aqueous beverage of acid character containing concentrated citrus fruit juice including sugar, a fruit acid, an added coloring material and a water soluble quinoid compound in amount sufficient to inhibit the fading of natural and added color present in the beverage upon exposure of the beverage to light but insufficient to impart an undesirable taste to the beverage.

RALPH H. HIGBY.